2,824,785

PRODUCTION OF KH₂PO₄, NaCl AND SODIUM PHOSPHATES

Menahem Merlub-Sobel, Jersey City, N. J., assignor to Horizons Incorporated, Princeton, N. J., a corporation of New Jersey No Drawing. Application February 20, 1956
Serial No. 566,359

4 Claims. (Cl. 23—107)

This invention relates to the production of potassium dihydrogen phosphate.

For many years, the fertilizer industry has recognized the potential advantages of a concentrated fertilizer material rich in both potassium and phosphate values. Extensive experimentation to produce either potassium dihydrogen phosphate ($KH_2PO_4$) or potassium metaphosphate ($KPO_3$) has, as yet, failed to yield a commercially attractive process. The metaphosphate contains 39.87% $K_2O$ and 60.13% $P_2O_5$ and is therefore particularly attractive as a highly concentrated (100%) plant food; the normal monopotassium phosphate ($KH_2PO_4$) is only slightly less concentrated, for it contains 34.61% $K_2O$ and 52.16% $P_2O_5$. In addition it has the desirable physical properties of being free-flowing and non-hygroscopic even at high humidities. Furthermore the compound $KH_2PO_4$ is highly soluble in marked contrast to the insoluble $KPO_3$.

Many methods have been proposed for the manufacture of the potassium phosphates, including a number based on the neutralization of phosphoric acid with potassium carbonate or potassium hydroxide or potassium chloride. Both the carbonate and hydroxide are disqualified as economically impractical. Processes based on the reaction between potassium chloride and phosphoric acid require an excess of concentrated phosphoric acid and for a substantial conversion to $KH_2PO_4$, the highly corrosive reaction mixture must be heated to temperatures on the order of 250° C. Under these conditions, the final reaction mass usually contains excess phosphoric acid which must be neutralized by potassium carbonate or potassium hydroxide to avoid contamination of the potassium phosphate product, thus adding appreciably to the cost of the process. Furthermore it appears that all the chlorine cannot be driven off from the reaction mixture without, at the same time, heating the phosphate to such a point that substantially all of it is completely dehydrated to produce the metaphosphate ($KPO_3$), which, because of its insolubility is less desirable for many fertilizer purposes.

Because of the economic and technical difficulties present in processes involving interaction of phosphoric acid with KOH, $K_2CO_3$ or KCl, others in the field have developed processes in which mixtures or complex compounds such as $KH_2PO_4.H_3PO_4$ are involved. Still others have endeavored to react KCl with $NH_4H_2PO_4$. Instead of producing a pure phosphate of potassium, the product in this case is inevitably a mixture of potassium and ammonium compounds because of the fact that $NH_4H_2PO_4$ and $KH_2PO_4$ form a continuous series of mixed crystals.

This disadvantage does not exist in the case of the interaction of monosodium phosphate and potassium chloride. This was recognized by Klingbeil who, in German Patent 222,913, proposed the addition of KCl to a solution of $NaH_2PO_4$, boiling down the solution until a condition of saturation with respect to NaCl is obtained and then cooling to effect crystallization of a substantial portion of the $KH_2PO_4$ present. The patentee then proposed to reheat the liquid remaining after separation of the $KH_2PO_4$ to boil away an additional amount of water, thereby crystallizing out parts of the sodium chloride. Evaporation is continued until the saturation point for potassium phosphate at the boiling point is reached. Thereafter the solution is cooled to recover part of the potassium phosphate, which crystallizes out on cooling. Repetition of the steps of heating, boiling off some of the water, crystallization of sodium chloride, cooling and crystallization of potassium dihydrogen phosphate, according to the patentee, carried the process to completion. The process has not achieved commercial success, even in Germany, because of the many expensive heatings and coolings, the corrosiveness of the solutions, and the latent possibility that during the crystallization of the sodium chloride some potassium phosphate would also be thrown out of solution. Another such process is disclosed in French Patent 706,548. The above disadvantages and various other limitations in prior art processes based on the reacton:

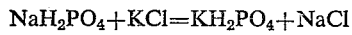

$$NaH_2PO_4 + KCl = KH_2PO_4 + NaCl$$

are avoided by the practice of my invention.

In accordance with the process I have developed, the potassium and phosphate values present in the reaction mixture may be quantitatively recovered. Briefly, my preferred practice consists in interacting monosodium phosphate ($NaH_2PO_4$) and potassium chloride (KCl) in a heated aqueous solution, preferably as concentrated as possible. The temperature and concentration are such that complete solution of both the $NaH_2PO_4$ and KCl is achieved. Then the solution is cooled to any convenient and economically justifiable temperature to precipitate the greater portion of the potassium dihydrogen phosphate ($KH_2PO_4$) present, in crystalline form. After the crystals are separated from the mother liquor, they are washed with ice water and then dried at 110° C. The mother liquor is treated with sufficient soda ash and/or caustic to reach a pH level corresponding to $Na_2HPO_4$ or $Na_3PO_4$. Because of the relatively low solubility of each of these salts at temperatures below 20° C., the phosphate values are readily precipitated as the hydrated sodium salts and are recovered by conventional means. I then heat the remaining liquid which is now substantially less corrosive than the unneutralized liquid. The neutralized liquid contains any potassium not recovered as $KH_2PO_4$. Heating is continued to boil off a portion of the water, and during this step sodium chloride is thrown out of solution. When the equilibrium point for the system KCl—NaCl—$H_2O$ is reached at the temperature of evaporation, I filter off the sodium chloride. In order to recover the potassium values, I employ the mother liquor in the preparation of the original hot solution of $NaH_2PO_4$ and KCl in a repetition of my process.

The following examples will serve to further illustrate the advantages of my process.

Example I

A six molar solution of $NaH_2PO_4$ and KCl was prepared by dissolving 720 parts by weight of $NaH_2PO_4$ (anhydrous basis) and 448 parts by weight of KCl in 1000 parts of water, heated to about 80° C. The solution, after thorough mixing, was cooled to room temperature (20° C.) and about 71% of the $KH_2PO_4$ was recovered in the form of crystals which separated from the cool solution. The solution was heated to about 80° C. and 144 parts by weight of caustic soda (anhydrous basis) were added to the hot solution with stirring, and then cooled to precipitate out the sodium phosphate. Substantially all of the phosphate was recovered by cooling to about 5° C. (The solubility of trisodium phosphate is about 41 grams/liter at 10° C. and only 15 grams/liter at 0° C.)

The alkaline filtrate was then reheated to the boiling point and evaporation was continued until the content of water was reduced to about 530 grams, sodium chloride being thrown out of solution during the evaporation. The crystalline sodium chloride was separated from the remaining liquid in any convenient way such as filtration, decantation, etc. The pH of the liquid was adjusted to a pH of about 4.0 by the addition of a sufficient amount of phosphoric acid solution, whereupon the liquid was returned to the process to be used in making up the next solution of $NaH_2PO_4$ and $KCl$, with due allowance for the $KCl$ content therein. In this way any potassium and phosphate values not previously recovered, are recycled to minimize the losses of these constituents.

It will be appreciated that the alkaline filtrate may be neutralized before the evaporation step, without otherwise altering the procedure described.

*Example II*

Example I was repeated except that the original solution was cooled below room temperature, by being refrigerated to 5° C. The recovered $KH_2PO_4$ was thereby increased to about 82% of the theoretical yield, but in all other respects the process was substantially similar.

By adding phosphoric acid, in appropriate amounts, to the $Na_2HPO_4$ or the $Na_3PO_4$ produced by the above described soda ash and/or caustic soda addition, it becomes possible to produce $NaH_2PO_4$ for return to the initial stage of the process wherein the monosodium phosphate and potassium chloride are reacted to form the desired $KH_2PO_4$.

While I have disclosed in my preferred method, heating the neutralized liquid to the equilibrium point for the system $NaCl-KCl-H_2O$, in order to precipitate the maximum amount of sodium chloride, it will be obvious to others skilled in the art that the heating may be discontinued short of this point if a lower recovery of sodium chloride is permissible or desired.

I claim:

1. In a process for producing potassium dihydrogen phosphate which includes in a first portion, the recovery of a substantial portion of the potassium dihydrogen phosphate by crystallization from a solution of potassium chloride and sodium dihydrogen phosphate, the improvement which comprises: separately recovering the potassium and phosphate values in the solution remaining after crystallization and removal of a substantial portion of the potassium dihydrogen phosphate from the solution originally formed of potassium chloride and sodium dihydrogen phosphate by adding a base from the group consisting of caustic soda and soda ash and mixtures thereof to the remaining solution, thereby precipitating at least one sodium phosphate from the group consisting of $Na_2HPO_4$ and $Na_3PO_4$; recovering the insoluble phosphate from the remaining liquid; heating the liquid to boil off a portion of the water contained therein, thereby precipitating sodium chloride; separating the solid sodium chloride; and recovering the potassium values in the liquid separated from the sodium chloride precipitate by returning the said liquid to the process for preparation of an additional solution of $KCl$ and $NaH_2PO_4$ from which $KH_2PO_4$ is to be recovered in a repetition of the process.

2. In a process for producing potassium dihydrogen phosphate which includes in a first portion, the recovery of a substantial portion of the potassium dihydrogen phosphate by crystallization from a solution of potassium chloride and sodium dihydrogen phosphate, the improvement which comprises: recovering the phosphate values in the solution remaining after crystallization and removal of a substantial portion of the potassium dihydrogen phosphate from the solution originally formed of potassium chloride and sodium dihydrogen phosphate by adding a base from the group consisting of caustic soda and soda ash and mixtures thereof to the remaining solution, thereby precipitating at least one sodium phosphate from the group consisting of $Na_2HPO_4$ and $Na_3PO_4$; and then recovering the insoluble phosphate from the remaining liquid.

3. In a process for producing potassium dihydrogen phosphate which includes in a first portion, the recovery of a substantial portion of the potassium dihydrogen phosphate by crystallization from a solution of potassium chloride and sodium dihydrogen phosphate, the improvement which comprises: separately recovering the potassium and phosphate values in the solution remaining after crystallization and removal of a substantial portion of the potassium dihydrogen phosphate from the solution originally formed of potassium chloride and sodium dihydrogen phosphate by adding a base from the group consisting of caustic soda and soda ash and mixtures thereof to the remaining solution, thereby precipitating $Na_2HPO_4$; recovering the insoluble phosphate from the remaining liquid; heating the liquid to boil off a portion of the water contained therein, thereby precipitating sodium chloride; separating the solid sodium chloride; and recovering the potassium values in the liquid separated from the sodium chloride precipitate by returning the said liquid to the process for preparation of an additional solution of $KCl$ and $NaH_2PO_4$ from which $KH_2PO_4$ is to be recovered in a repetition of the process.

4. In a process for producing potassium dihydrogen phosphate which includes in a first portion, the recovery of a substantial portion of the potassium dihydrogen phosphate by crystallization from a solution of potassium chloride and sodium dihydrogen phosphate, the improvement which comprises: separately recovering the potassium and phosphate values in the solution remaining after crystallization and removal of a substantial portion of the potassium dihydrogen phosphate from the solution originally formed of potassium chloride and sodium dihydrogen phosphate by adding caustic soda to the remaining solution, thereby precipitating $Na_3PO_4$; recovering the insoluble phosphate from the remaining liquid; heating the liquid to boil off a portion of the water contained therein, thereby precipitating sodium chloride; continuing the heating until the equilibrium point for the system $NaCl-KCl-H_2O$ is reached for the evaporation conditions of temperature, pressure, and extraneous ions present; separating the solid sodium chloride; and recovering the potassium values in the liquid separated from the sodium chloride precipitate by returning the said liquid to the process for preparation of an additional solution of $KCl$ and $NaH_2PO_4$ from which $KH_2PO_4$ is to be recovered in a repetition of the process.

References Cited in the file of this patent

UNITED STATES PATENTS

| | | |
|---|---|---|
| 1,020,293 | Klingbiel | Mar. 12, 1912 |
| 1,961,127 | Coleman | June 5, 1934 |
| 2,062,866 | Coleman | Dec. 1, 1936 |